Figure 2:
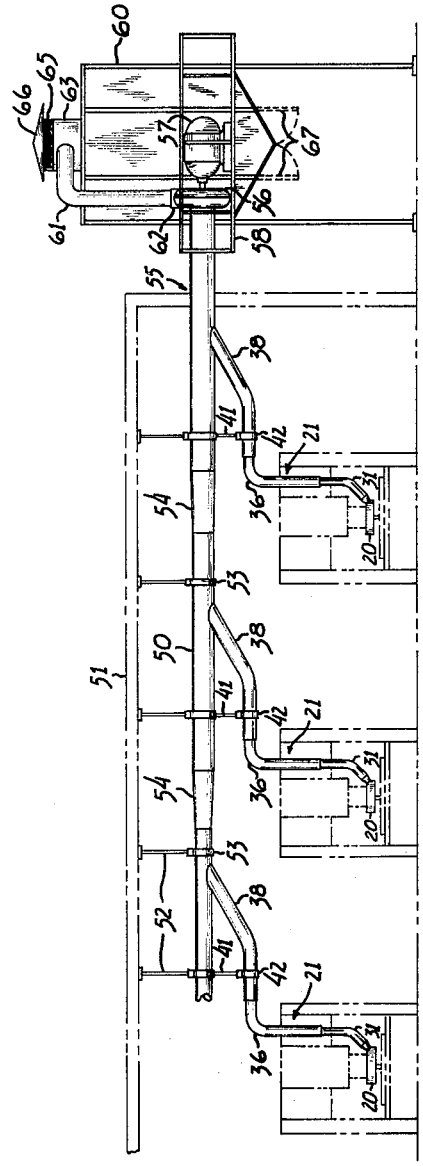

Jan. 26, 1965        G. D. GIBBONS ETAL        3,167,260
CHIP COLLECTION AND DISPOSAL APPARATUS
Filed Dec. 23, 1960        2 Sheets-Sheet 1
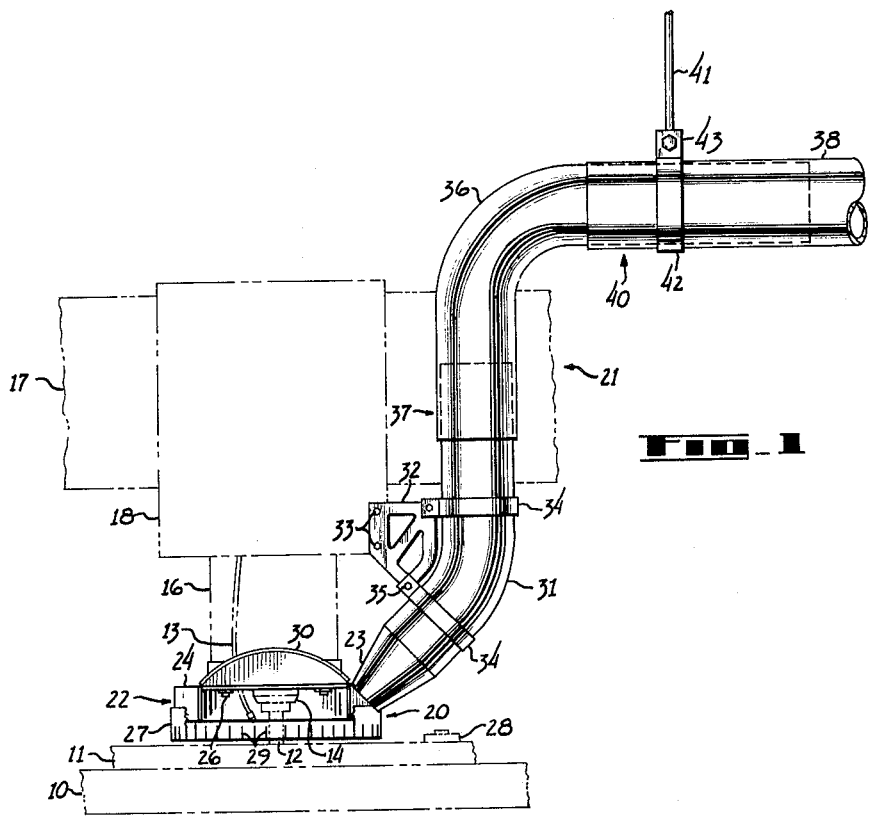
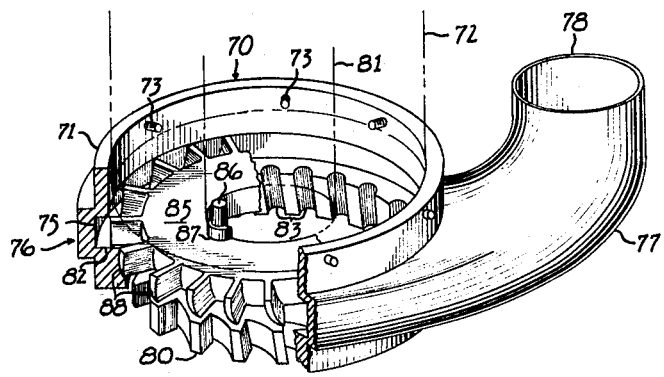
INVENTORS
GREGORY D. GIBBONS
JAMES C. STARNES
BY
ATTORNEY Jan. 26, 1965  G. D. GIBBONS ETAL  3,167,260
CHIP COLLECTION AND DISPOSAL APPARATUS
Filed Dec. 23, 1960  2 Sheets-Sheet 2

INVENTORS
GREGORY D. GIBBONS
JAMES C. STARNES
BY
ATTORNEY 3,167,260
CHIP COLLECTION AND DISPOSAL APPARATUS
Gregory D. Gibbons and James C. Starnes, Fort Worth,
Tex., assignors to General Dynamics Corporation, San
Diego, Calif., a corporation of Delaware
Filed Dec. 23, 1960, Ser. No. 78,080
2 Claims. (Cl. 241—56)

The present invention relates generally to chip collection and disposal apparatus and more particularly to apparatus for removing cuttings, shavings and chips produced by machine tools in machining operations. (As employed in the following specification and claims, the term "chips" shall be construed to mean that material which is removed from a workpiece by the action of a machine tool operating thereon and shall include such forms as cuttings, shavings, borings, filings, and the like.)

Recent developments in machine tool automation have made possible extremely large stock removal rates. For example, there is now available a numerical tape-controlled milling machine employing dual, synchronized cutting heads capable of milling two parts simultaneously. In a typical milling operation, such as the fabrication of aluminum missile bulkheads, a machine of this class is capable of removing one-hundred fifty pounds of material per hour. While this is desirable from the standpoint of production rate and cost, it also serves to accentuate the problem of disposing of the chips necessarily produced during such an operation. In addition to being a serious safety hazard, such chips retard cutter cooling, if allowed to accumulate about the cutter and generally interfere with the work of the machine and operator.

There are various chip handling devices presently available, including a water canal conveyor, an endless belt conveyor, and a screw type conveyor. Although such systems generally accomplish their design intent quite satisfactorily, certain disadvantages are inherent in each. All the systems mentioned are designed to be located below floor level, hence must be installed during the initial construction of the machine shop building. A more serious objection, however, is that the chips must be manually deposited on the conveyor, i.e., no provision is made for collecting the chips as they are initially scattered on and about the machine.

The present invention comprises a nozzle means positioned about the cutter of a machine tool to which is attached a duct means leading to a storage container. An air moving means is located in the duct means that creates a suction at the nozzle means. This suction at the nozzle means creates an air flow of sufficient velocity to carry the chips with the flow of the air. Thus as the chips are generated by the machine's cutter they are drawn into the duct means by the air flow and deposited in the storage container. While the invention is useful on machine tools in general, it has specific advantages when used with end milling machines, face milling machines or the like, as will become more evident in the description.

Numerous advantages result from the use of the present invention. Of primary importance is the fact that the collection system is fully automatic, requiring no chip raking, sweeping, or other handling by shop personnel. Since the chips are drawn into the system immediately after formation, the hazard to safety of flying chips is eliminated. Immediate removal of the chips also permits more efficient cooling of the cutter and workpiece, which results in longer cutter life and minimum damage to the workpiece due to heat. The coolant used in most machine tool operations is a mixture of water and oil which is sprayed directly onto the cutter in vapor form. The present invention also removes the oil vapor, after it has performed its function, thereby preventing contamination of the air in the shop and the deposition of an oily film upon the machines and shop floor. As is apparent from the foregoing advantages, the present system results in greater overall shop efficiency and cost savings. A further advantage is that this system may be installed overhead, as well as below floor level, thus making installation possible either during construction of the building or at anytime thereafter. In either event it may be installed without loss of valuable floor space. By employing a manifold duct arrangement the present system may also be adapted for use on a plurality of machine tools.

It is, therefore, an object of this invention to provide an improved chip removal apparatus.

Another object of the present invention is to provide an improved chip removal apparatus for installation on a machine tool, the operation of which is completely automatic.

Another object of the invention is the provision of chip removal apparatus which eliminates the safety hazard of flying chips.

Another object is to provide chip removal apparatus which may be installed in established machine shops.

Another object resides in the provision of chip removal apparatus for installation on a machine tool which permits more efficient cooling of the cutter.

Another object of the invention is a chip removal apparatus that will remove long and ribbon like chips.

These and other objects and advantages will be more apparent to those skilled in the art upon consideration of the following description of the appended drawings wherein:

FIGURE 1 is a view of the nozzle and a portion of the duct as installed on an end mill machine;

FIGURE 2 diagrammatically illustrates the use of the present apparatus on a plurality of machine tools; and FIGURE 3 shows an alternate configuration of the nozzle for use on machine tools which produce long, ribbon or wirelike chips.

Referring now to FIGURE 1 of the drawings, there is shown (by the broken lines) a typical end mill machine equipped with the present chip removal apparatus. Such a machine includes a work table or bed 10 upon which is positioned a workpiece 11, a cutter 12, a coolant line 13, a chuck 14 attached to the shaft of a motor (not shown), a housing 16 about such motor, an overhead member 17, and a structure 18 for suspending the motor housing from the overhead member. Milling machines of this type normally employ a two axis milling head which is movable in vertical and lateral directions. (The term "milling head," as used herein, includes the suspending structure 18, motor housing 16, motor (not shown), chuck 14, and cutter 12.) Movement along the third axis perpendicular to the other two is accomplished by employing a movable machine bed 10.

The chip removal apparatus comprises a collector nozzle 20, a duct system, a portion of which is shown at 21, and a fan (to be shown and explained in conjunction with FIGURE 2). The nozzle consists of a short cylindrical portion 22 positioned about the cutter and a divergent portion 23 connected with the cylindrical component at its smaller end and with the duct system at its larger end. The cylindrical portion is closed at its upper end by means of a flat, circular plate 24 having holes therethrough to permit passage of the coolant line 13 and the chuck 14. Attachment of the nozzle to the machine is effected with bolts 26 which extend through plate 24 into the motor housing 16. To the lower portion of the cylindrical component is attached a skirt 27 composed of a relatively stiff, yet flexible and resilient material, such as a heavy rubberized fabric. The skirt serves to provide the nozzle with a downward extension which will permit same to move freely over the clamps, as at 28, which are normally used to fasten the workpiece to the machine bed. The flexibility of the skirt may be increased by slitting the lower portion thereof at spaced intervals thereabout, as indicated at 29. In order to give the machine operator greater access to the chuck and cutter, it is desirable to provide a door 30 which is pivoted to swing upwardly and thus leave an opening in the cylindrical portion 22 through which the operator may work, for example, in changing cutters.

The nozzle is connected with a first duct component 31 which is curved such that its upper portion extends vertically upward. Such first duct component is fixedly attached to the machine's suspending member 18 by means of a mounting bracket 32 fastened to the suspending member by bolts 33, and a pair of bands 34 about the duct which are affixed to the bracket with bolts 35.

At its upper end the first duct component is joined with a second duct component 36. The inner diameter of the second component is slightly larger than the outer diameter of the first component so that the latter may extend into the former, thus forming a first sliding or "telescope" joint 37 which compensates for vertical movement of the mill head. The distance that the first component extends into the second component is determined by the vertical travel of the mill head, and generally should exceed such travel by approximately three inches. In this manner when the mill head is in the fully extended, down position, there is still a three inch overlap in the joint. Above the joint the second duct component is curved to a horizontal direction which is parallel with the lateral line of movement of the mill head. At its upper end the second duct component extends into a third duct component 38 thereby forming a second telescope joint 40 which compensates for lateral movement of the mill head in the same manner as joint 37 described above. The third duct component is suspended by a rod 41 attached to a band 42 about the duct by means of a bolt 43.

For installation on a machine having a three axis milling head, it is necessary to provide an additional duct component which is perpendicular to duct components 31 and 38 and contains a third telescope joint.

As will be seen in the following discussion the third duct component 38 is connected through other duct components with a blast fan which creates a high velocity flow of air, or suction through the nozzle and duct system which picks up or "captures" the chips as they are generated and transports them to a suitable storage container.

In a machine shop having several milling machines it is advantageous to use a chip removal system as illustrated in FIGURE 2. Each machine is equipped with the nozzle 20 and the partial duct system 21 already described. The third duct components 38 join a manifold duct 50 which is suspended from the shop ceiling 51 by means of rods 52 and bands 53 encircling the manifold. The rods 41 and bands 42 which support the duct components 38 are fastened to such bands 53. It is desirable that the angle at which duct components 38 join the manifold be as small as is feasible in order to minimize the turbulence of the airflow within the manifold.

Since the chips produced by the milling machines must be disposed of periodically, it is desirable that such chips be deposited and stored in a manner which will minimize, or preferably eliminate, manual handling thereof. In order to accomplish this, the manifold 50 extends through the wall of the machine shop as at 55, and is connected with a centrifugal type blast fan 56 driven by an electric motor 57, both of which are mounted on a catwalk 58 around the bottom of an elevated storage bin or hopper 60. A duct 61 connects the fan outlet 62 with a conventional cyclone device 63, positioned within the hopper, which serves to decrease the velocity of the air as it emerges from the duct system. The cyclone is vented through a screen wire covered opening 65 between the top edge thereof and a cover 66 over the cyclone. The lower surface of the hopper is provided with doors which open downwardly, as indicated by the dotted lines at 67, so that when the hopper is filled with chips, a truck or trailer may be driven beneath the hopper, the doors opened and the chips emptied into the truck. In this manner manual handling of the chips is altogether eliminated.

In order to assure consistent chip removal at each of the machines, it is desirable to maintain a relatively constant airflow velocity throughout the complete duct system. This is accomplished by employing divergent joints 54 between the junctures of duct components 38 with the manifold. Such a joint diverges in the direction of the airflow, thus increasing the cross-sectional area of the manifold as it approaches the fan 56. The amount of area increase at each divergent joint is substantially equal to the cross-sectional area of the duct 38 entering the manifold immediately in front of the joint (considering the direction of the airflow). Thus at the machine farthest from the fan, the cross-sectional area of the manifold is equal to that of the duct 38, while at a position immediately adjacent the fan the cross-sectional area of the manifold is approximately equal to the combined cross-sectional areas of all the ducts 38 which join the manifold.

For an explanation of the operation of the present chip removal system, reference is again made to FIGURE 1. The chips normally produced by an end mill have a high surface area-to-weight ratio and are therefore relatively easy to collect with the present system. As the chips are generated by the cutting tool 12 they have an initial velocity resulting from the rotary motion of the cutting tool which is directed radially and upwardly. The blast fan creates a high velocity flow of air through the duct system, the air being drawn thereinto through the gap between the lower edge of the skirt 27 on nozzle 20 and the upper surface of the workpiece 11. The velocity of such airflow is increased at the nozzle as a result of the reduction in the cross-sectional area of the divergent portion 23 adjacent the cylindrical portion 22. The airstream "captures" most of the chips as they are initially formed and draws them directly into the duct system 21. Those chips which are not immediately captured are stopped by the cylindrical portion 22 and skirt 27, fall into the airstream and are then transported into the duct system 21. From the duct system the chips pass into the manifold 50 (FIGURE 2), are drawn into the fan 56 and exhausted through the duct 61 and cyclone 63 into the hopper 60, where they are stored until such time as they are disposed of in the manner already described.

In FIGURE 3 there is shown an adaptation of the nozzle component of the present chip removal apparatus for installation on a machine tool, such as a conventional face mill machine, that generates chips of a long, ribbon-like or stringlike configuration. In order to remove such chips effectively it is necessary to break them into smaller segments and remove them in this form.

The nozzle, generally indicated by the numeral 70, comprises a cylindrical portion 71 which is attached to the motor housing 72 of the machine by means of bolts 73. A circumferential groove 75 is formed about the interior surface of the cylindrical portion, the purpose of which groove will be explained below. In order to maintain the required wall thickness, the exterior surface of the cylindrical portion extends outwardly slightly adjacent the groove, as indicated at 76. On one side of the cylindrical portion a conduit 77 is connected therewith at the level of the groove. Such conduit 77 is flat at its juncture with the cylindrical portion and terminates in a circular portion 78. A duct system (not shown) similar to that described in conjunction with FIGURES 1 and 2 joins the circular portion and serves to transport the chips to a storage container. The cross-sectional area of that portion of the conduit 77 adjacent the cylinder wall 71 is less than that of the circular portion 78, such that the airflow velocity adjacent the cylinder wall is greater than that in the circular portion. Thus the chips are more readily captured by the airstream.

The face mill cutter 80 which is fixed to the shaft 81 of the motor (not shown) extends below the lower edge of the cylindrical component 71. The upper edge of the cutter is at a level slightly lower than the lower horizontal surface 82 of the groove 75. Below the groove the internal diameter of the cylindrical component is smaller than the diameter of the upper portion thereof. This provides a greater wall thickness in that area so that grooves 83 may be formed therein. Such grooves are preferably slanted slightly from the vertical in the direction of rotation of the cutter 80. Above the cutter an impeller 85 is affixed to the motor shaft 81 by means of a key 86. Such key is provided with a stop 87 which serves to prevent the impeller from moving upward on the shaft during milling operations. The impeller is formed with radial vanes 88 about the periphery thereof which extend into the groove 75. The impeller serves a dual purpose in this nozzle configuration. First it creates a high velocity airstream through the nozzle which flows upwardly through grooves 83 and out the conduit 77 into the duct system. The velocity of the airstream is augmented by the blades of the face mill cutter 80, which serve to compress the air and force it upwardly as such blades pass the grooves 83 on the lower, inner portion of the cylindrical component 71. And secondly the impeller serves to break the long chips into smaller segments which are readily captured in the airstream. Thus as the chips are produced by the face mill cutter 80, the airstream initially pulls them upward through the slots 83 and into the groove 75. The impeller, rotating in such groove at the same rate as the cutter, strikes the chips and breaks them into relatively small segments which are easily transported by the airstream through the duct system to a storage container. While a blast fan, as described in conjunction with FIGURE 2, may be employed to increase the airflow created by the impeller 85, this is unnecessary if the storage container is sufficiently near the milling machine.

While certain preferred embodiments of the present invention have been herein illustrated and described it is to be understood that the invention is not limited thereto, as numerous modifications will be apparent to those skilled in the art, and the invention is to be given the broadest possible interpretation within the terms and scope of the following claims:

What we claim is:

1. Apparatus for removing chips from about the cutter of a machine tool comprising a nozzle for attachment about said cutter, said nozzle including a tubular portion and a conduit portion connected with said tubular portion, said tubular portion having an internal, medial groove thereabout and substantially axial grooves below said medial groove, an impeller having radial vanes affixed to the shaft of the milling machine motor above said cutter, said impeller vanes extending outwardly into said medial groove for breaking up long ribbonlike chips, duct means connected at one end with said conduit and at the opposite end with a storage container, said duct means including means for compensating for movement of said cutter, said impeller creating a high velocity airflow into said nozzle and through said duct means whereby said chips produced by said cutter are drawn into said nozzle through said axial grooves, broken into relatively small segments by said impeller and transported through said duct means to said storage container.

2. In an apparatus for removing chips from a material cutting machine having cutting means capable of engaging and cutting the surface of a material comprising, nozzle means for substantially enclosing the volume above said surface of said material surrounding said cutting means, said nozzle being capable of being operatively positioned adjacent to but spaced from said surface of said material in a manner allowing restricted airflow therebetween, means in conjunction with said space between said surface of said material and said enclosing means for creating an airflow directed upwardly from said surface of said material with sufficient velocity to carry said chips, said airflow creating means including duct means connected to said nozzle means for receiving and providing a passage for said high velocity air and said chips, said duct means having air moving means positioned therein for drawing said air and said chips through said nozzle means and said duct means, and said nozzle means at the point of connection to said duct means having a smaller cross-sectional area than the cross-sectional area of said duct means.

References Cited by the Examiner

UNITED STATES PATENTS

| Re. 20,687 | 4/38 | Grozier. | |
| 2,205,541 | 6/40 | Pizzotti. | |
| 2,236,232 | 3/41 | Brescka et al. | 51—273 |
| 2,379,503 | 7/45 | Teager. | |
| 2,759,301 | 8/56 | Valette et al. | 51—273 |
| 2,801,437 | 8/57 | Okun | 15—385 XR |
| 2,944,465 | 7/60 | Jones | 90—11 |

FOREIGN PATENTS 96,905  4/23  Switzerland.

WILLIAM W. DYER, JR., *Primary Examiner.*

J. SPENCER OVERHOLSER, *Examiner.*